United States Patent Office 2,888,420
Patented May 26, 1959

2,888,420

AQUEOUS COMPOSITION COMPRISING PIGMENT, CATION DISPERSING AGENT, CATION LATEX, AND A FORMALDEHYDE-AMINO TRIAZINE CONDENSATION PRODUCT AND PROCESS FOR DYEING TEXTILES THEREWITH

Georg Sulzer and Peter Guertler, Basel, Willy Fatzer, Bottmingen, and Arthur Maeder, Basel, Switzerland, assignors to Ciba Limited, Basel, Switzerland, a Swiss firm No Drawing. Application November 13, 1956
Serial No. 621,513

Claims priority, application Switzerland December 1, 1955

5 Claims. (Cl. 260—29.4)

This invention relates to a process for dyeing with pigments and preparations suitable therefor.

The invention provides a process in which valuable pigment dyeings are obtained when aqueous dye-baths are used which contain pigments dispersed with cation-active dispersing agents and as binding agent a cation-active latex of a polymerisable plastic and an aqueous dispersion, produced with a cation-active dispersing agent, of a derivative, insoluble in water but soluble in organic solvents, of a formaldehyde condensation product of an amino compound yielding with formaldehyde hardenable resins and, after drying, hardening is carried out at elevated temperature. The dyeings obtainable according to the invention are distinguished as a rule by good fastness to migration and satisfactory to good fastness to washing. In comparison with comparable dyeings in the production of which only one of the specified binding agents is used, they possess in general the advantage of better fastness to wet rubbing.

For the preparation of the cation-active polymer latices such polymers can be used as contain no groups which render the same cation-active but which are dispersed with cation-active dispersing agents. Preferably such are used as contain cation-active groups. The polymers can be homo or copolymers. They are preferably derived from monomeric compounds with the atom grouping

for example from vinyl esters of organic acids such as vinyl acetate, vinyl formate, vinyl butyrate or vinyl benzoate or also from vinyl alkyl ketones, vinyl halides, such as vinyl chloride or vinyl fluoride, vinylidene chloride or vinyl aryl compounds such as styrene and substituted styrenes, or also from compounds of the acrylic acid and methacrylic acid series, such as esters from acrylic acid and alcohols or phenols, for example ethyl acrylate, butyl acrylate or dodecyl acrylate. Further monomeric compounds that can serve for the synthesis of the polymers are acrylonitrile, acrylamide and derivatives substituted on the amide nitrogen, also analogous derivatives of methacrylic acid, α-chloracrylic acid, crotonic acid, maleic acid or fumaric acid, finally polymerisable olefines such as isobutylene, butadiene, 2-chloro-butadiene or heterocyclic compounds, such as the various vinyl pyridines. The manufacture of binary, ternary or more complicatedly constructed copolymers in emulsion form is known so that it is not necessary to describe it further. The following are a few suitable copolymers:

(a) Copolymer from 66 parts of n-butyl acrylate, 12 parts of styrene and 22 parts of vinyl isobutyl ether, (b) Copolymer from 70 parts of asym. dichlorethene and 30 parts of butyl acrylate.

(c) Copolymer from 50 parts of asym. dichlorethene, 45 parts of butyl acrylate and 5 parts of acrylamide, (d) Copolymer from 52 parts of vinyl chloride, 35 parts of butyl acrylate, 7 parts of methyl acrylate and 6 parts of acrylamide.

For the cation-active dispersion of such polymers there can be used, for example, compounds of high fatty amines with acetic acid, hydrochloric or sulfuric acid, such as octadecylamine acetate, (dodecyl)-diethyl-cyclohexylamine sulfate and also salts of diethylaminoethyl esters of higher fatty acids or salts of the type of oleylamidoethyl-diethylamino acetate

Quaternary ammonium compounds, such as cetyldimethyl-benzyl ammonium chloride, cetyl-trimethyl ammonium bromide, p-(trimethylammonium)-benzoic acid, cetyl ester, methosulfate, cetylpyridinium methosulfate, octadecyl-trimethylammonium bromide or the quaternary compound from diethyl sulfate and triethanolamine tristearate are also suitable.

The manufacture of latices of polymers with cation-active groups is known per se; such products are described for example in U.S. patent applications, Serial No. 464,599, filed October 25, 1954, by Arthur Maeder and No. 464,608, filed October 25, 1954, by Arthur Maeder and in U.S. patent applications, Serial No. 464,-600, filed October 25, 1954, by Arthur Maeder et al. and No. 556,017, filed December 28, 1955, by Arthur Maeder et al.

The above mentioned derivatives of formaldehyde condensation products of an amino compound yielding hardenable resins with formaldehye, which derivatives are insoluble in water but soluble in organic solvents, are likewise used in the form of dispersions. These derivatives can be derived on one hand from formaldehyde condensation products of urea, thiourea, guanidine, acetylene-di-urea, dicyandiamide or uron, or also from aminotriazines such as melamine or from guanamines such as acetoguanamine, benzoguanamine or formoguanamine, and on the other hand from alcohols immiscible with water such as butyl alcohol, amyl alcohol, hexyl alcohol, cyclohexanol, benzyl alcohol, lauryl alcohol, oleyl alcohol or abiethyl alcohol. In addition to the ether residues, the condensation products can also contain radicals of high-molecular acids, for example stearic acid. When such high-molecular acid radicals are present, the compounds can also be derived from methylol ethers with low-molecular water-soluble alcohols. The manufacture of such condensation products is known. The manufacture of the aqueous dispersions can likewise take place with the use of the cation-active dispersing agents mentioned above.

As pigments there can be used in the process of the present invention the customary inorganic pigments such as carbon black, titanium oxide, iron oxide or organic pigments, such as vat dyestuff or azo dyestuff pigments, in so far as they can be dispersed with a cation-active dispersing agent. As cation-active dispersing agents for the pigments, the above mentioned products are concerned.

For the acceleration of the hardening of the hardenable compounds, there are advantageously added to the dye-baths hardening catalysts, for example ammonium salts of strong acids. The hardening takes place under the customary conditions, for example at 120–160° C. for 2–10 minutes.

Dyeing according to the present invention can take place under the customary dyeing conditions, for example by the exhaust process but preferably by the foulard process.

The fiber materials to be treated according to the invention are primarily fabrics of natural or regenerated cellulose, such as cotton, linen, artificial silk or staple fiber, or also cellulose esters, such as acetate silk, wool or synthetic fiber materials such as nylon, polyester fibers or polyacrylonitrile fibers.

The following examples illustrate the invention, the parts being by weight unless otherwise stated and the relation between parts by weight and parts by volume being the same as that between the kilogram and the liter.

*Example 1*

Cotton poplin is dyed on the foulard in a dye-bath containing per liter—

10 grams of a 15% dyestuff paste of copper phthalocyanine which is dispersed with [β-(octadecenoylamido)-ethyl]-diethylmethylammonium-methosulfate.

5 grams of a 70% emulsion of methylolmelamine-allyl-ether modified with soya fatty acid, emulsification having been carried out with 10% of [β-(octadecenoylamido)-ethyl]-diethylmethylammonium-methosulfate.

40 grams of a copolymer latex with 40% dry content, from 10 parts of the quaternary compound from acrylic acid-(3-diethylaminopropyl)-amide and chloracetamide, 150 parts of isobutyl acrylate and 40 parts of acrylonitrile with [γ-(lauroylamido)-propyl]-diethylmethylammonium methosulfate as emulsifier and 4 grams of ammonium nitrate.

Dyeing is carried out on the foulard up to 80% uptake of liquid, drying is effected on a frame and hardening carried out for 5 minutes at 150° C.

A level blue dyeing is obtained of good migration fastness and satisfactory fastness to washing.

*Example 2*

(a) The process is conducted as described in Example 1 but there are used 10 grams per liter of a copolymer latex with 40% dry content from 90 parts of vinyl acetate and 10 parts of the quaternary compound from acrylic acid-(3-diethylamino-propyl)-amide and chloracetamide with [γ - (lauroylamido) - propyl] - trimethyl - ammonium-methosulfate as emulsifier.

(b) The process is conducted as described in Example 1 but there is used 40 grams per liter of a copolymer latex with 40% dry content of 50 parts of vinyl acetate, 40 parts of n-butylacrylate and 10 parts of the quaternary compound from acrylic acid-(3-diethylaminopropyl)-amide and chloracetamide with [γ-(stearoylamido)-propyl]-dimethyl-(β-hydroxyethyl)-ammonium phosphate as emulsifier.

(c) The process is conducted as described in Example 1 but there are used 10 grams per liter of the condensation resin emulsion and 80 grams per liter of the latex mentioned under (b).

What we claim is:

1. A process for dyeing fibrous material with pigment, which comprises contacting the material with an aqueous composition of matter which contains a pigment dispersed with a cation-active dispersing agent and as pigment binders about 114 to 457 parts by weight of (a) a cation-active latex of a flexible elastic polymerization plastic which has been obtained by polymerization of ethylenically unsaturated compounds which, when containing terminal

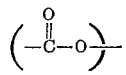

radicals, contain said terminal radicals as completely esterified carboxylic acid groups and which plastic is the sole water-insoluble constituent in said latex and about 100 parts by weight of (b) an aqueous dispersion, produced with a cation-active dispersing agent, of a water-insoluble derivative which is soluble in organic solvents of a condensation product of formaldehyde with an aminotriazine, drying the material and heating to harden the composition applied, said parts by weight being calculated on the dry content of the several binders.

2. A process for dyeing fibrous material with pigment which comprises contacting the material with an aqueous composition of matter which contains a pigment dispersed with a cation-active dispersing agent and as pigment binders about 114 to 457 parts by weight of (a) a cation-active latex of a flexible elastic polymerization plastic which itself contains no cation-active groups but is dispersed with a cation-active dispersing agent and has been obtained by polymerization of ethylenically unsaturated compounds which, when containing terminal

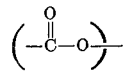

radicals, contain said terminal radicals as completely esterified carboxylic acid groups and which plastic is the sole water-insoluble constituent in said latex and about 100 parts by weight of (b) an aqueous dispersion, produced with a cation-active dispersing agent, of a water-insoluble ether of a methylol melamine which is soluble in organic solvents; drying the material and heating to harden the composition applied, said parts by weight being calculated on the dry content of the several binders.

3. A process for dyeing fibrous material with pigment, which comprises contacting the material with an aqueous composition of matter which contains a pigment dispersed with a cation-active dispersing agent and as pigment binders about 114 to about 457 parts by weight of (a) a cation-active latex of a flexible elastic polymerization plastic wherein the polymer itself contains cation-active groups and has been obtained by polymerization of ethylenically unsaturated compounds which, when containing terminal

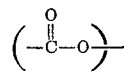

radicals, contain said terminal radicals as completely esterified carboxylic acid groups and which plastic is the sole water-insoluble constituent in said latex and about 100 parts by weight of (b) an aqueous dispersion, produced with a cation-active dispersing agent, of a water-insoluble ether of a methylol melamine which is soluble in organic solvents; drying the material and heating to harden the composition applied, said parts by weight being calculated on the dry content of the several binders.

4. A process for dyeing fibrous material with pigment, which comprises contacting the material with an aqueous composition of matter which contains a pigment dispersed with a cation-active dispersing agent and as pigment binders about 114 to about 457 parts by weight of (a) a latex of a copolymerization product from 10 parts of the quaternary compound from acrylic acid-(3-diethylaminopropyl)-amide and chloracetamide, 150 parts of isobutyl acrylate, and 40 parts of acrylonitrile with [γ - (lauroyl - amido) - propyl] - diethylmethyl ammonium methosulfate as emulsifier and about 100 parts by weight of (b) an aqueous dispersion, produced with β - (octadecenoylamido) - ethyl - diethylmethyl ammonium-methosulfate, of a methylol melamine-allyl-ether modified with soya fatty acid; drying the material and heating to harden the composition applied, said parts by weight being calculated on the dry content of the several binders.

5. A concentrated aqueous composition of matter comprising a pigment dispersed with a cation-active dispersing agent and as pigment binders about 114 to 457 parts by weight of (a) a cation-active latex of a flexible elastic polymerization plastic which has been obtained by the polymerization of ethylenically unsaturated compounds which, when containing terminal

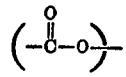

radicals, contain said terminal radicals as completely esterified carboxylic acid groups and which plastic is the sole water-insoluble constituent in said latex and about 100 parts by weight of (b) an aqueous dispersion, produced by a cation-active dispersing agent, of a water-insoluble derivative which is soluble in organic solvents of a condensation product of formaldehyde with an aminotriazine, said parts by weight being calculated on the dry content of the several binders.

References Cited in the file of this patent

UNITED STATES PATENTS 2,760,945    Bodenschatz et al. _____ Aug. 28, 1956